United States Patent Office 3,618,218
Patented Nov. 9, 1971

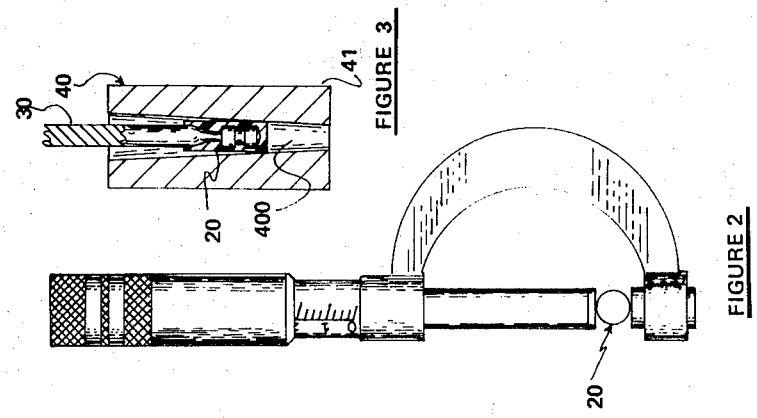
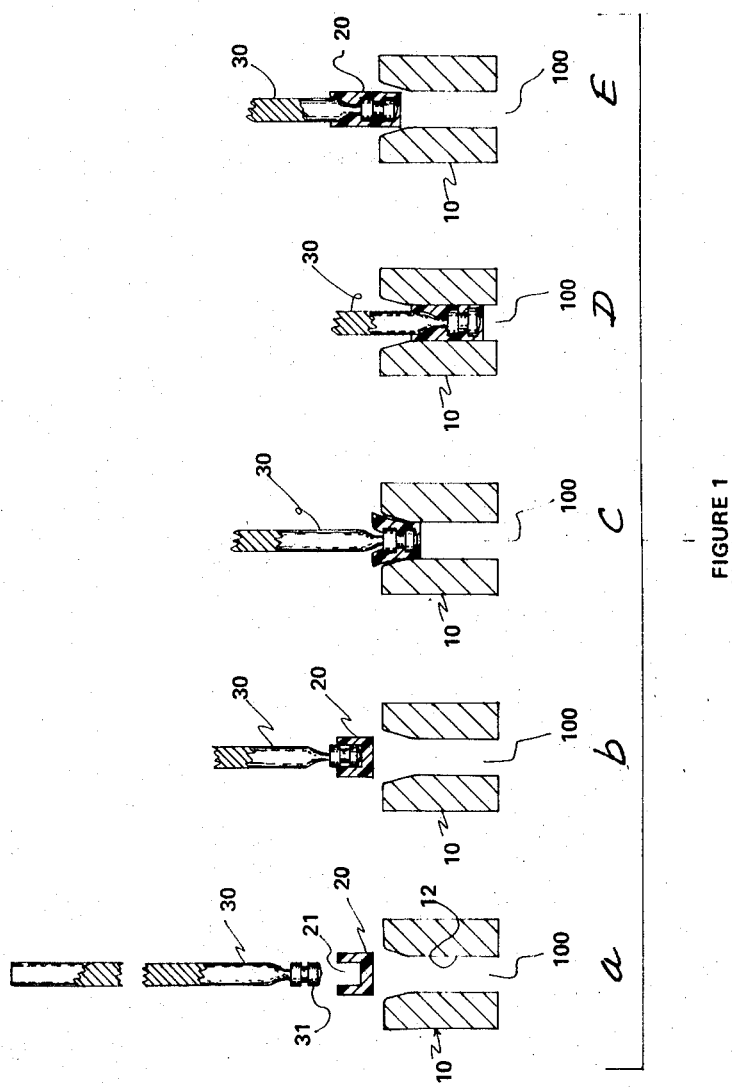

3,618,218
PROCESS FOR MEASUREMENT OF INACCESSIBLE SMALL DIAMETER BORES
Rano J. Harris, Sr., 1945 Carolyn Sue Drive, Baton Rouge, La. 70815
Filed Oct. 21, 1969, Ser. No. 868,097
Int. Cl. G01b 3/00
U.S. Cl. 33—174 R                             11 Claims

ABSTRACT OF THE DISCLOSURE

A method for the accurate, precise and rapid measurement of relatively inaccessible openings of small internal diameter, including especially capillary size openings. In taking a measurement, a segment of thermoplastic material of cross-section somewhat larger than the diameter of the opening or bore to be measured is fitted upon a male member, is forced into and compressed within the internal opening to be measured, the thermoplastic material thereby taking the external shape and size of the opening. The thermoplastic material, while in place, is heated, preferably above its softening point, set, and then withdrawn from the said opening. Measurement ex situ of the outside diameter of the withdrawn segment of thermoplastic material, because of the retention by the latter of the size and shape of the internal opening, permits highly accurate and precise measurement of the inaccessible internal opening.

---

The present invention was facilitated by subject matter disclosed and claimed in copending application Ser. No. 762,791, filed Sept. 26, 1968, herein incorporated by reference. Therein is disclosed a method for the formation of durable leak-proof seals.

Seals of such character are formed upon male members by encapsulation thereof with very thin layers of thermoplastic materials, are heat-stressed and shaped at temperatures below the softening point of the thermoplastic materials while retained within bores of restricted diameter. After such treatment, the encapsulated plunger ends maintain a tight fit when retained within the same bore, or inserted within other bores of diameter equal to those in which they were formed. This is because of an elastic memory, by virtue of which the material tends to expand to its former larger size and shape, thus pressing against the side walls forming the bore, to provide effective leak-proof seals. The present invention, as will be understood, utilizes, in part, the technique therein disclosed for forming, and heat-treating, a thermoplastic material within a bore whose internal diameter is to be measured.

Techniques are generally known for the accurate and precise measurement of inaccessible internal openings or bores of small diameter. Unfortunately, however, the taking of such measurements is difficult, and quite time-consuming. For example, the cross-sectional diameter of the capillary bore of a glass tube can be accurately measured by use of a micrometer microscope. In measurement of a specimen, the latter is secured in place, the fine cross hairs of the instrument are optically aligned at a point upon a side of the opening, and an initial reading is taken. The cross hairs are than traversed across the large diameter of the cross section to a point one hundred and eighty degrees removed from the point of the initial reading, and another reading is taken. The difference in readings is a measure of the diameter of the cross-section of the specimen. Several readings are usually taken across different longitudinal axes at points one hundred and eighty degrees apart, and results are averaged to minimize error.

Another time tested and preferred technique for measuring inaccessible internal diameters makes use of mercury. For example, the bore of a tared segment of tubing is filled with mercury, and the segment of tubing then weighed. The difference in the initial and final weighing gives the weight of mercury contained within the bore. The length of the column of mercury is then accurately measured, generally by use of optical equipment. Since the density of mercury at given temperature is readily determinable, the average diameter of the cylindrical column of mercury which, of course, is also a measure of the internal diameter of the bore, can be readily calculated.

Despite the accuracy of such measurements, they are nonetheless quite time-consuming. Moreover, the methods require the use of relatively expensive equipment, and a certain amount of manual dexterity and training. In addition, the mercury method, in particular, is more difficult to use in the measurement of openings within nontransparent materials, and in fact the method is generally limited to the measurement of transparent materials. In either type of measurement, representative specimens must often be selected from longer lengths of tubing.

Accordingly, it is a primary objective of the present invention to obviate these and other problems and, in particular, to provide a new and improved method for accurately, precisely, and rapidly measuring inaccessible openings or bores of small internal diameter.

In particular, it is an object to provide a method which requires a minimum of equipment and training for rapidly taking precise and accurate measurements of inaccessible openings of very small internal diameter, including capillary openings and bores.

It has now been found that the foregoing and other related objects and advantages can be attained, in accordance with the present method, which comprises disposing a segment of oversized thermoplastic material within a bore, or internal opennig to be measured, heating the material while in place, preferably above its softening point, and permitting the plastic material to take on the external shape and size of the said bore. The thermoplastic is set and it is then withdrawn from the bore. Measurement ex situ of the outside diameter of the withdrawn segment of thermoplastic material, because of the retention by the latter of the size and shape of the internal opening, permits highly accurate and precise measurement of the internal diameter of the inaccessible opening.

In a preferred mode of practicing the invention, a cap or segment of thermoplastic material is fitted upon the end of a male member, viz., wire or plunger of somewhat smaller diameter. The cap, of external diameter slightly larger than the internal diameter of the bore to be measured, is then inserted into the said bore. The cap, on entering the bore, is compressed to the size of the bore and, upon heating, it is even more closely conformed to the size and shape of the bore. On setting, as may occur upon cooling the thermoplastic material below the softening point, the wire or plunger is withdrawn, the plastic covered portion thereof retaining the internal diameter of the bore. The internal diameter of the bore is thus accurately and precisely determined ex situ by measurement of the plastic covered portion of the wire or plunger, as via the use of a micrometer, external calipers, by trial and error insertion and fitting within a series of tubes of known calibrated diameters, or by insertion within a calibrated conical tube or tapered bore as hereafter described.

Various thermoplastic material can be used in the practice of this invention. The characteristics of these materials are that they must be compressible, capable of being softened by heat, and capable of setting. Preferred materials are thermoplastic organic materials which can be resized and reshaped, particularly by compression. It is also preferable that the material can be softened by heat without heating to too great a temperature. Preferred materials are those which can be heat-softened at temperatures ranging between about 200° F. and about 425° F., and preferably from about 250° F. to about 350° F. Preferably, the thermoplastic material is one which, after heat-softening, will reset upon mere cooling below the softening point. Organic materials, including polyamides, polyesters, polyvinyl chloride and materials sold under the trade names "Nylon," "Perlon" and under the registered trademark "Terylene," are illustrative of such materials. The polyfluoroethylenes, particularly polytetrafluoroethylene sold under the trade name "Teflon," are also exemplary and, in fact, these self-lubricating plastics are particularly preferred materials used in the practice of the present invention. The temperature of softening to some extent depends on the nature of the material, and to some extent upon the time over which heat is applied.

These and other features and advantages will be better understood by reference to the following detailed description and to the accompanying drawings, greatly magnified in size for convenience, to which reference is made in the description.

Referring to the drawings:

FIG. 1 depicts graphically, in partial section, the process, or series of progressive steps (1a through 1e), employed in shaping and setting a segment of thermoplastic so that its external diameter conforms with the internal diameter of an inaccessible internal bore of small diameter;

FIG. 2 depicts completion of the measurement of the internal diameter of the bore by ex situ measurement of the shaped segment of thermoplastic material; and FIG. 3 depicts a preferred type of ex situ measurement made via insertion of the shaped segment of thermoplastic material into a tapered bore of calibrated known cross-sections.

Referring to FIG. 1, there is shown a sequence of five figures—viz., 1a through 1e—describing the capping of the forward end of a section of wire 30 with a segment of thermoplastic material 20, and its shaping and setting within the inaccessible bore 100, formed by the enclosing wall 12 of tubular member 10, the internal diameter of which is to be measured.

The cap of thermoplastic material 20 is open centered and generally cut in cylindrical shape of external diameter slightly larger than the internal diameter of the bore to be measured. An opening 21 is thus cut part way through the cap along its axis to provide a recess for engagement by a male member, i.e., the forward end of wire 30. The forward end of wire 30, the external diameter of which corresponds generally with the diameter of the internal opening 21, on the other hand, is preferably roughened, anodized or underscored as via use of a groove 31 to provide a nonsmooth surface for retention of the cap 21. The insertion of the forward end of wire 30 into the cap 21 is shown by comparison of FIGS. 1a and 1b.

It will be observed by reference to FIGS. 1b, 1c and 1d that as the cap 20 is thrust into the bore 100, the oversized cap is compressed to correspond in external diameter with the internal diameter of the bore 100. While the cap 20 is completely within the bore 100, as shown by reference to FIG. 1d, heat is applied to the tubular member 10 and the cap 20 is heated to a temperature just above its softening point. The source of heat (not shown) is then removed and the cap 20 is permitted to cool to a temperature below its softening point.

The wire 30 is then withdrawn to remove the cap 20 from the bore 100, as shown by reference to FIG. 1e. The internal measurement of the bore 100 is then ascertained by ex situ measurement of the external diameter of the cap 20 as via measurements taken with a micrometer as shown by reference to FIG. 2.

A particularly preferred device for measurement of the external diameter of the shaped segment of thermoplastic material 20, and consequently of the internal diameter of the bore 100, is illustrated by reference to FIG. 3. In that figure is shown a tube 40 formed by an enclosing inwardly converging wall 41 providing a tapered bore 400. The inward taper of the bore is of course, greatly exaggerated for convenience of illustration in the drawing. The tube 40 is preferably constructed of transparent material, e.g., glass or clear plastic, and can be scribed, or otherwise provided, with indicia marks (not shown) which indicate the cross-sectional diameter of the bore 400 at any given depth or tube location. By use of such device, the shaped, set cap 20 can be thrust downwardly into the bore 400 until it moves no further. At the cross-section of intersection of the forward end of cap 20 with the wall 41, the cross-sectional diameter of the cap 20 corresponds with the internal diameter of the bore 400 at that location. Visual reading of a scale (not shown) on the tube, or adjacent the tube, provides an easy, quick and accurate technique for an ex situ measurement of the internal diameter of a bore 100.

The sequence of steps shown by reference to FIGS. 1a through 1e is generally similar to that described in my copending application Ser. No. 765,791, supra. In the technique described for making leak-proof seals, however, the thermoplastic material is heated to a point just below the softening point so that the material upon setting will retain its elastic memory. This is contrasted with the present invention, however, where it is preferred to heat the thermoplastic material above its softening point to destroy the memory of the thermoplasic material. Thus, since it is desired to reproduce the inside diameter of the measured bore, there is no advantage to be gained by post expansion. It can be stated, however, that even with the post-expansion the error introduced is relatively small and where the expansion characteristics of the material is known, or ascertained in advance by experiment, a correction factor can be readily applied to measurements to obtain a very high degree of accuracy.

In the encapsulation of the forward end of a wire, it is highly preferable that the thermoplastic material be applied as a very thin diameter layer, ranging in thickness from about 0.001 to about 0.005 inch. In so doing, any error which should occur due to any post-expansion of the thermoplastic material would be minimized. To accomplish this, the diameter of the wire used for encapsulation should be smaller than the inside diameter of the bore to be measured by an amount corresponding to twice the thickness of the thermoplastic material coated upon the end of the wire.

The present invention finds its greatest utility in the measurement of very small bores ranging from only a few thousandths to several hundredths of an inch internal diameter. This method is thus highly suitable for measurement of bore diameters ranging from as little as about 0.002 inch to about 0.10 inch, and intermediate diameters ranging about 0.005 inch to about 0.050 inch.

From the foregoing it is seen that the present invention provides a novel and relatively highly accurate and efficient method for producing measurements of inaccessible internal bores or openings. It is apparent that various changes, such as in absolute or relative dimension of the parts, materials used and the like, as well as the suggested mode of taking ex situ measurements, can be made without departing the spirit and scope of the invention, as will now be apparent to those skilled in the art.

Having described the invention, what is claimed is:

1. A method for measurement of inaccessible, small diameter bores comprising
   capping a male member of smaller external diameter than that of the bore to be measured with a segment of thermoplastic material of external diameter greater than that of the said bore to be measured,
   forcing the capped end of the said male member into the bore and reducing the external diameter of the thermoplastic material to correspond to the internal diameter of the measured bore, heating and setting the thermoplastic capped end of said male member within the measured bore, withdrawing the capped end of the male member from the bore, and measuring ex situ the external diameter of the capped end which corresponds with the internal diameter of the measured bore.

2. The method of claim 1 wherein the bore is of capillary size.

3. The method of claim 1 wherein the bore ranges from about 0.002 to about 0.10 inch.

4. The method of claim 1 wherein the thermoplastic material constituting the capping member is Teflon.

5. The method of claim 1 wherein the thermoplastic material constituting the cap is heated, inside the measured bore, to temperatures ranging from about 200° F. to about 425° F.

6. The method of claim 1 wherein the thermoplastic material constituting the cap is heated above the softening point of the said material, and then permitted to set prior to withdrawal of the male member from the bore, by allowing the cap to cool below the softening point of the thermoplastic material.

7. The method of claim 1 wherein the difference between the external diameter of the smaller diameter male member and the internal diameter of the measured bore, after heat-setting and prior to withdrawal from the bore, is measured by an amount corresponding to twice the thickness of the thermoplastic material coated on the male member, and the thickness of the coating ranges from about 0.001 to about 0.005 inch.

8. A method for measurement of inaccessible small diameter bores according to claim 7 wherein after direct ex situ measurement of the diameter of the encapsulated forward end of the withdrawn male member, a correction factor is applied to compensate for post-expansion of the thermoplastic material.

9. The method of claim 7 wherein at the time of heat setting the thermoplastic material encapsulating the forward end of the male member, and prior to withdrawal of the said member from the measured bore, the thermoplastic material is heated above its softening point.

10. The method of claim 9 wherein the thermoplastic material is Teflon.

11. The method of claim 1 wherein the ex situ measurement is made by insertion of the capped end of the said male member into a calibrated tapered bore.

No references cited.

LEONARD FORMAN, Primary Examiner

G. G. KUEHL, Assistant Examiner

U.S. Cl. X.R.

33—168 R, 175, 178 B; 264—249; 29—520, 407